United States Patent
Hori et al.

(10) Patent No.: US 7,234,849 B2
(45) Date of Patent: Jun. 26, 2007

(54) VEHICLE LIGHTING APPARATUS

(75) Inventors: Takashi Hori, Shizuoka (JP); Kiyotaka Fukawa, Shizuoka (JP); Fusao Fukazawa, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 217 days.

(21) Appl. No.: 10/888,608

(22) Filed: Jul. 9, 2004

(65) Prior Publication Data
US 2005/0018437 A1  Jan. 27, 2005

(30) Foreign Application Priority Data
Jul. 10, 2003  (JP)  ............ P. 2003-272725

(51) Int. Cl.
*B60Q 1/12* (2006.01)
(52) U.S. Cl. ........................ 362/466; 362/37
(58) Field of Classification Search ........... 362/465, 362/456, 457, 458, 37, 466, 467, 468
See application file for complete search history.

(56) References Cited

U.S. PATENT DOCUMENTS

| 3,614,416 | A | * | 10/1971 | Fleury | 362/469 |
| 4,858,080 | A | * | 8/1989 | Oikawa | 362/466 |
| 5,060,120 | A | * | 10/1991 | Kobayashi et al. | 362/465 |
| 5,588,733 | A | * | 12/1996 | Gotou | 362/37 |
| 5,711,590 | A | * | 1/1998 | Gotoh et al. | 362/43 |
| 5,876,113 | A | * | 3/1999 | Gotoh | 362/466 |
| 5,988,837 | A | * | 11/1999 | Eichhorn et al. | 362/464 |
| 6,010,237 | A | * | 1/2000 | Gotou | 362/460 |
| 6,059,435 | A | * | 5/2000 | Hamm et al. | 362/514 |
| 6,193,398 | B1 | * | 2/2001 | Okuchi et al. | 362/466 |
| 6,302,553 | B1 | * | 10/2001 | Izawa | 362/37 |
| 6,305,823 | B1 | * | 10/2001 | Toda et al. | 362/276 |
| 6,357,898 | B1 | * | 3/2002 | Toda et al. | 362/466 |
| 6,478,460 | B2 | * | 11/2002 | Furuya et al. | 362/514 |
| 6,843,588 | B2 | * | 1/2005 | Iwamoto et al. | 362/466 |
| 7,150,546 | B2 | * | 12/2006 | Fukawa | 362/464 |
| 2001/0030870 | A1 | * | 10/2001 | Hiramatsu et al. | 362/465 |

FOREIGN PATENT DOCUMENTS

| JP | 08-301005 | 11/1996 |
| JP | 2002-160581 | 6/2002 |

\* cited by examiner

*Primary Examiner*—Alan Cariaso
*Assistant Examiner*—Leah S Lovell
(74) *Attorney, Agent, or Firm*—Fish & Richardson P.C.

(57) ABSTRACT

A vehicle lighting apparatus can help improve irradiation for different speeds of an automobile. The vehicle lighting apparatus includes lamps for installation at front portions of an automobile. An irradiation direction of the lamps can be deflected in left and right directions based on a steering operation of a steering apparatus, and a rate of change of a deflection angle of the lamps with respect to the steering angle is made smaller as the vehicle speed increases to a high speed.

4 Claims, 8 Drawing Sheets

VEHICLE LIGHTING APPARATUS

TECHNICAL FIELD

The present disclosure relates to a lighting apparatus for a vehicle which may be applied to a headlight apparatus of a vehicle such as an automobile. In particular, the disclosure relates to a vehicle lighting apparatus which is provided with a light distribution control means, for example, an adaptive front-lighting system ("AFS") for changing the illumination direction and area of a lamp in accordance with a traveling state of the vehicle.

BACKGROUND

The applicant of the present disclosure previously has proposed, in patent document JP-A-2002-160581, an AFS to improve the safety of an automobile while traveling. As shown in the conceptual diagram of FIG. 1, an automobile (CAR) has a steering sensor 1A for detecting a steering angle of a steering apparatus and a vehicle speed sensor 1B for detecting a vehicle speed. The detection outputs of the sensors 1A, 1B are provided to an electronic control unit ("ECU") 2. The ECU 2 controls the irradiation area, e.g., the irradiation direction of head lamps 3 (i.e., swivel type lamps 3R, 3L) provided at the right and left front portions of an automobile so as to deflect in the left and right directions based on the received detection outputs to change the light distribution characteristics. According to the AFS, when an automobile travels on a curved road, it is possible to deflect the irradiation direction of the swivel type lamps in accordance with the steering angle of the automobile to illuminate the portion of the road ahead of the curve, thereby improving travel safety.

In such an AFS, when the left and right swivel type lamps are controlled to deflect only in accordance with the steering angle, various problems may occur. Trials have been performed in an attempt to eliminate such problems. For example, patent document JP-A-8-301005 proposes a technique in which the changing rate of the deflection of the swivel type lamps is made sufficiently large to control the deflection angle to a large extent when traveling at a high speed, and a portion of the road ahead of the vehicle (in the direction of travel) is irradiated earlier as the speed becomes higher to improve visibility. That patent document also proposes a technique to eliminate an incongruity resulting from the delay of the deflection operation of the swivel type lamps relative to the steering operation when the vehicle moves from a straight road to a curved road. According to that patent document, the swivel type lamps are deflected at a small changing rate even in an area where a steering angle is small such as when traveling state on a straight road.

In the technique disclosed in patent document JP-A-8-301005, the deflection angle of the swivel type lamps is made large during high speed travel of the automobile. However, when traveling on a road, such as a superhighway, with a large radius of curvature, automobiles typically travel at a high speed compared to their speed when traveling on a road with a small radius of curvature. Thus, when the deflection angle of the swivel type lamp is set to a large value during travel at a high speed, the deflection angle may become too large compared to the radius of curvature of the road. Thus, the lamps irradiate an area ahead of the automobile, but off the road. In such cases, the road is not irradiated suitably. Further, according to the technique of patent document JP-A-8-301005, when traveling in a state that is close to the straightly traveling state, although the rate of change of the deflection angle of the swivel type lamp is made small with respect to the steering angle, the deflection operation is not completely stopped. Thus, as described in patent document JP-A-8-3010052, the swivel type lamps may be deflected frequently, which may bother the driver. In particular, when traveling on a superhighway, the vibration from the road surface is applied to the steering, and the steering may vibrate with a small steering angle. In accordance with such a vibration, the swivel type lamps are deflected by a small angle, and it is difficult to eliminate the uncomfortable feeling that may be caused to the driver.

SUMMARY

The present disclosure addresses how to provide a vehicle lighting apparatus with improved irradiation when the vehicle travels at different speeds.

A technique is disclosed in which the changing rate of the deflection angle of the lamps with respect to a steering angle is made smaller as the vehicle speed increases to a high speed. A dead zone of the steering angle is provided in which the deflection operation of the lamps is not performed for a predetermined range of the steering angle, including a steering angle at a time of traveling on a straight road.

Since the rate of change of the deflection angle of the lamps with respect to a steering angle is made smaller as the vehicle speed increases to a high speed, when traveling on curved roads with different radii of curvature, the deflection angle of the lamps can be controlled in correspondence with the vehicle speed in close relation to the radius of curvature of the curved road. Thus, when traveling at the respective speed ranges, a portion of the road ahead of the curve can be irradiated to improve safety. Further, the dead zone of the steering angle is provided to reduce the uncomfortable feeling that a driver may experience when traveling on a road that is substantially straight. Furthermore, in a range of the steering angle which is smaller than a predetermined steering angle and except for the dead zone, the deflection angle with respect to a given steering angle becomes larger as the vehicle speed increases, so that it becomes possible to irradiate a portion of the road ahead of the curve with a higher priority during high speed travel. Thus, it becomes possible to irradiate curved roads with different radii of curvature.

Various other features and advantages may be apparent from the following detailed description, the accompanying drawings and the claims.

DETAILED DESCRIPTION

According to the invention, the width of the dead zone may be made smaller as the vehicle speed increases. Furthermore, in a range of the steering angle which is smaller than the predetermined steering angle and excepting for the dead zone, the deflection angle with respect to the steering angle may be increased as the vehicle speed increases.

EMBODIMENT 1

Figure 1:
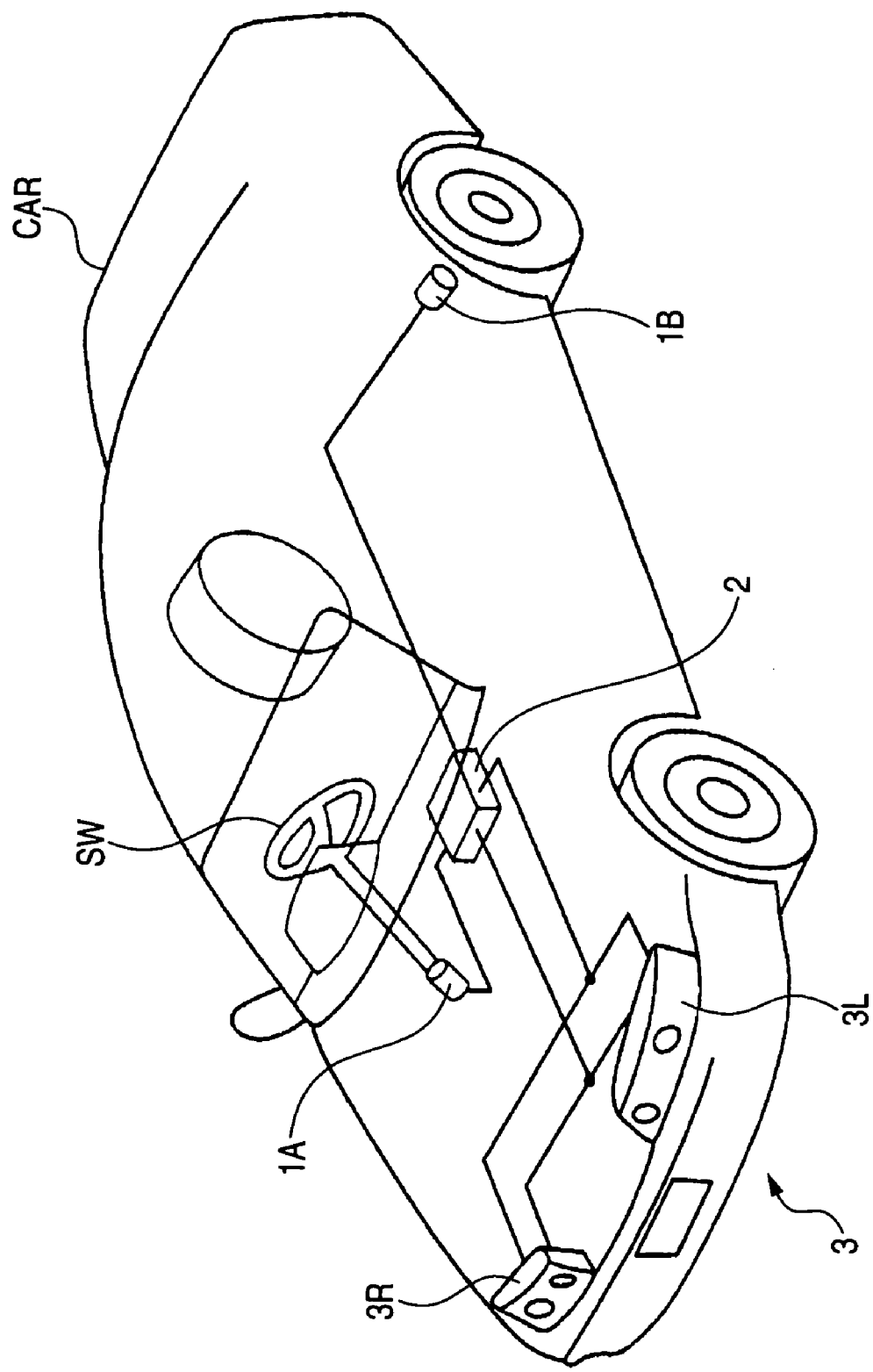
FIG. 1 is a diagram showing a schematic configuration of an AFS.
Figure 2:
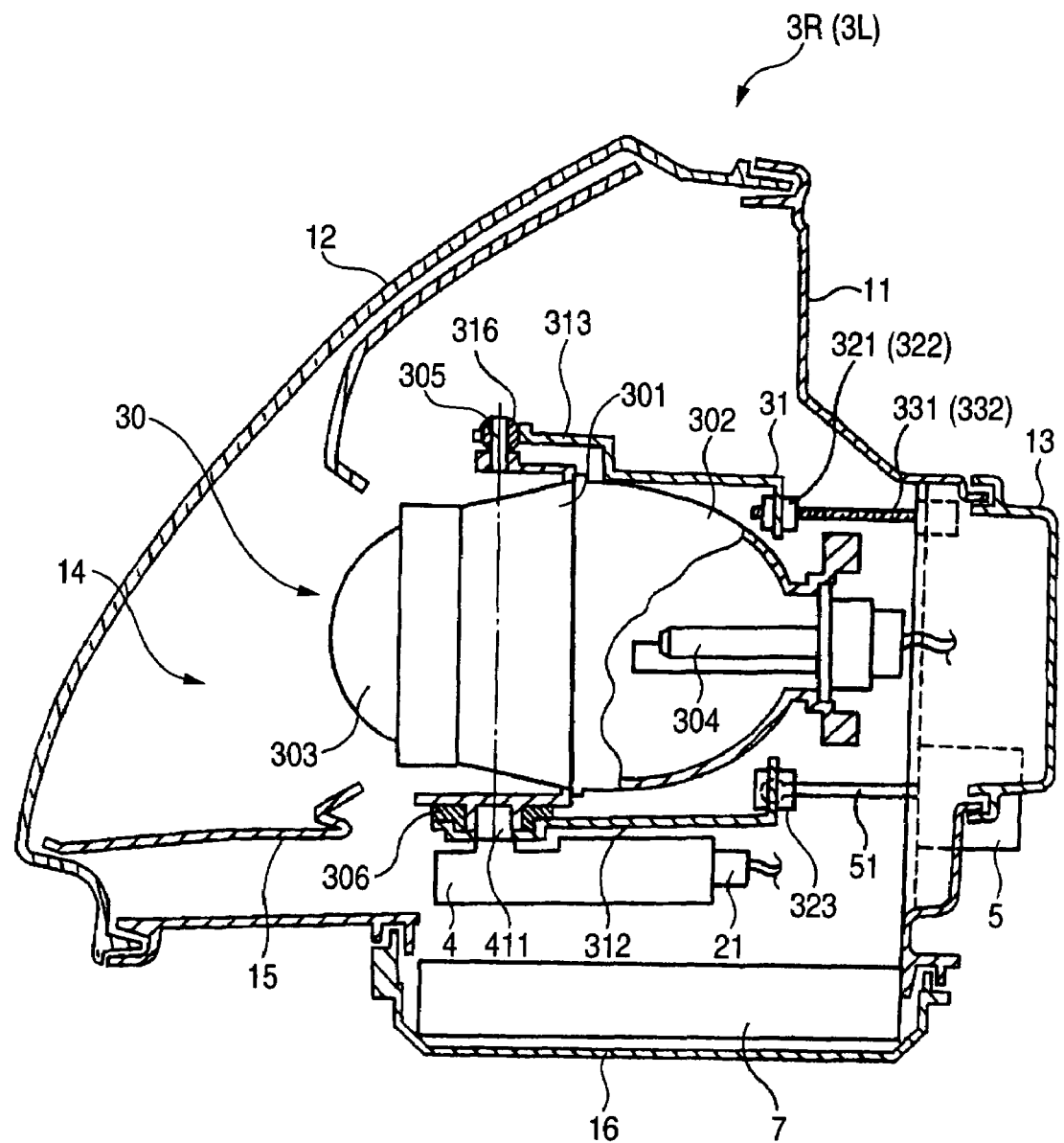
FIG. 2 is a vertical sectional diagram of a swivel type lamp.
Figure 3:
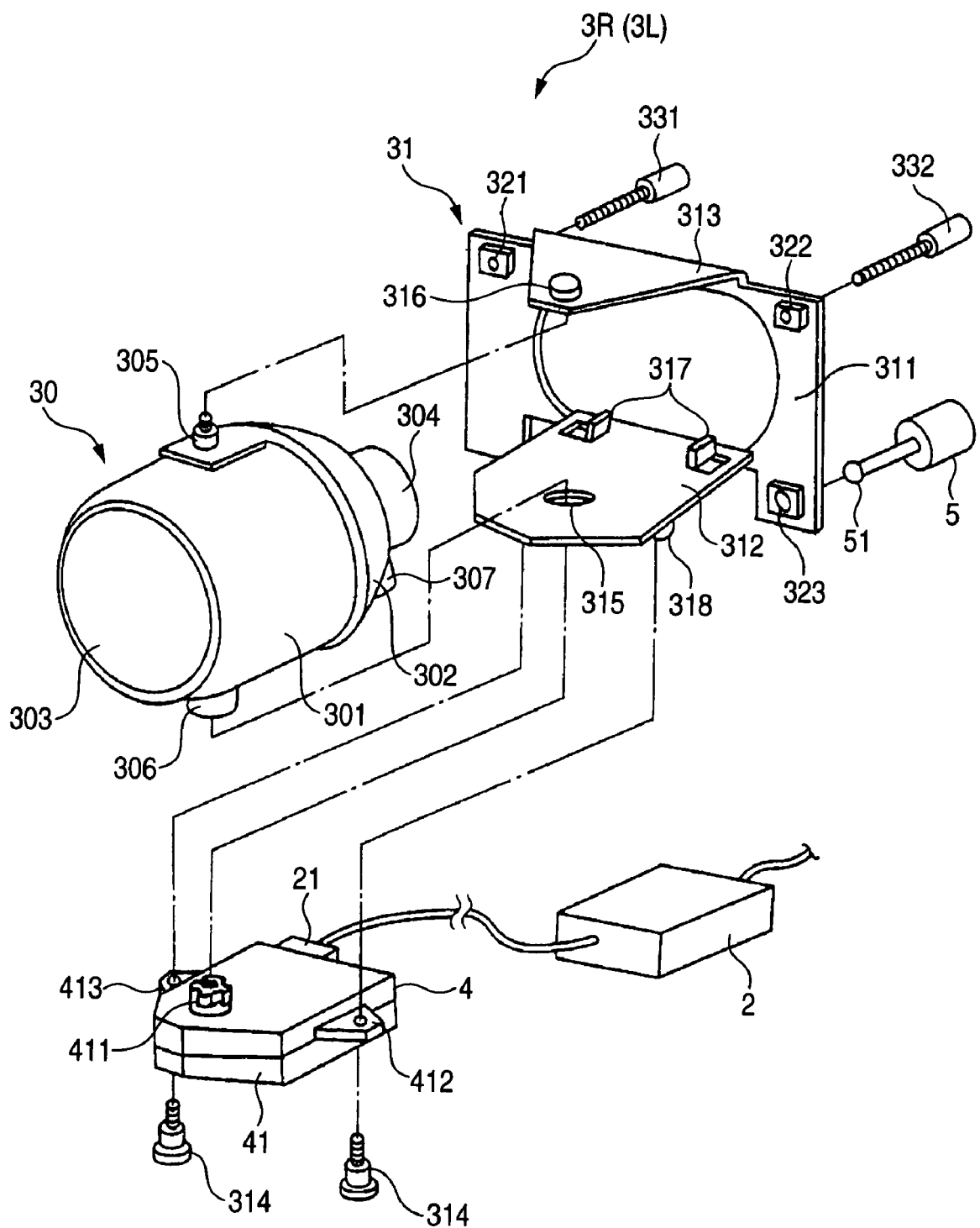
FIG. 3 is an exploded perspective view showing the main portion of the inner structure of the swivel type lamp.

Detailed examples of embodiments of the invention are explained below with reference to the accompanying drawings. FIG. 2 is a vertical sectional diagram of the inner structure of a swivel type lamp, which includes elements of the AFS explained above in connection with FIG. 1, which is capable of deflecting the irradiation direction to the left and right. FIG. 3 is a partially exploded perspective view of the main portion of the swivel type lamp. A lamp body 11 is provided with a lens 12 at its front opening and a rear cover 13 at its rear opening to form a lamp chamber 14. A projector lamp 30 is disposed within the lamp chamber 14. The projector lamp 30 is integrally formed by a sleeve 301, a reflector 302, a lens 303 and a light source 304. Projector lamps are well known. Therefore, a detailed explanation of the projector lamp is not provided. The projector lamp 30 may use a discharge valve as the light source 304. The projector lamp 30 is supported by a bracket 31 configured in an almost U-shape. An extension 15 is disposed about the projector lamp 30 within the lamp body 11 so that the inner portion of the swivel type lamp is not exposed through the lens 12. Furthermore, in this embodiment, a lighting circuit 7 for turning on the discharge valve of the projector lamp 30 is provided within the swivel type lamp by using a lower cover 16 attached to the bottom opening of the lamp body 11.

The projector lamp 30 is supported by being sandwiched between a lower plate 312 and an upper plate 313, each of which is bent almost perpendicularly from the vertical plate 311 of the bracket 31. An actuator 4, described below, is fixed on the lower side of the lower plate 312 by means of screws 314. The rotation output shaft 411 of the actuator 4 protrudes from the upper side through a shaft hole 315 perforated at the lower plate 312. Each of the screws 314 is fastened by a protruding boss 318 on the lower surface of the lower plate 312. A shaft portion 305 at the upper surface of the projector lamp 30 is fit into and coupled to a bearing 316 at the upper plate 313, and a coupling portion 306 at the lower surface of the projector lamp 30 is fit into the rotation output shaft 411 of the actuator 4, such that the projector lamp 30 is rotatable in the right and left directions with respect to the bracket 31. Furthermore, as described in greater detail below, the projector lamp can be rotated in the horizontal direction integrally with the rotation output shaft 411 in accordance with the operation of the actuator 4.

The bracket 31 is integrally attached with aiming nuts 321, 322 at the left and right portions of the upper portion thereof when seen from the front side, respectively, and is integrally attached with a leveling bearing 323 at the lower portion on the right side thereof. The aiming nuts are screwed and engaged with a horizontal aiming screw 331 and a vertical aiming screw 332 rotatably supported by the lamp body 11 and the leveling pole 51 of the leveling mechanism 5 is fit into the leveling bearing. The bracket 31 can be rotated in the horizontal direction and the vertical directions by rotating these horizontal aiming screw 331 and vertical aiming screw 332 with respect to their shafts. Further, the bracket 31 can be rotated in the vertical direction by moving the leveling pole 51 forward and backward along the axial direction thereof by means of the leveling mechanism 5. Thus, it becomes possible to perform an aiming adjustment for adjusting the optical axis of the projector lamp 30 in the left and right directions and the vertical direction and also to perform a leveling adjustment for adjusting the optical axis of the projector lamp in the vertical direction in accordance with the leveling state caused by the change of the vehicle height. A projection 307 protrudes at the lower surface of the reflector 302 of the projector lamp 30. A pair of stoppers 307 is formed at the left and right positions of the lower plate 312 of the bracket 31 opposite the projection in a manner of being cut and raised from the lower plate. The projection 307 bumps against one of the stoppers 317 in accordance with the rotation of the projector lamp 30, whereby the rotation range of the projector lamp 30 is restricted.

The actuator 4 includes a case 41 having a shape similar to a pentagon. The case 41 is provided with supporting pieces 412, 413 so as to protrude outside at both the side surfaces thereof, respectively. These supporting pieces are used to fix the case 41 to the bosses 318 of the bracket 31 by means of the screws 314. The rotation output shaft 411, configured in a spline configuration, protrudes from the upper surface of the case 41 and is coupled to the coupling portion 306 of the bottom surface of the projector lamp 30. The rotation output shaft 411 is rotated reciprocally within a predetermined rotation angle by a motor 42 described later which is housed within the actuator 4. A connector (not shown) is disposed on the rear surface of the case 41 so that an external connector 21 coupled to the ECU 2 is fit into the connector.

Figure 4:
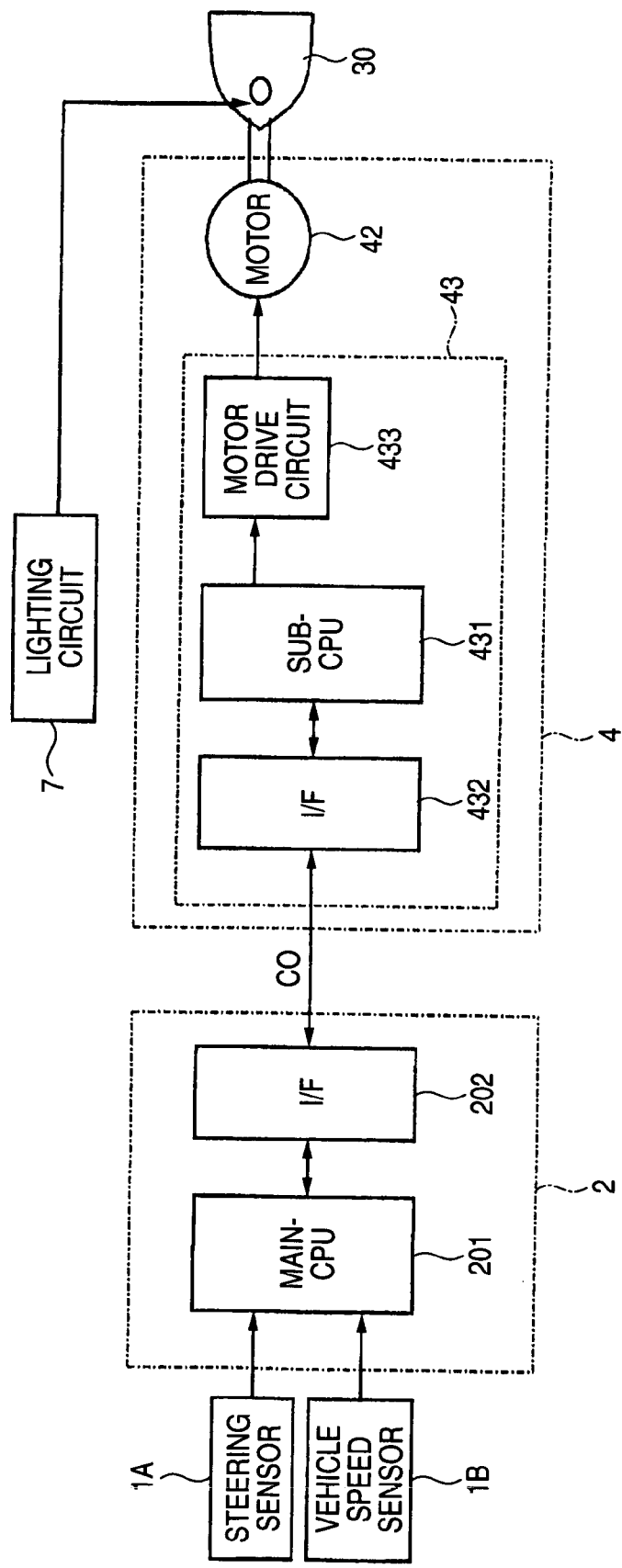
FIG. 4 is a block circuit diagram showing a circuit configuration of the AFS.

FIG. 4 is a block diagram showing an electric circuit configuration of the lighting apparatus, including the ECU 2 and the actuator 4. The actuator 4 is provided at each of the right and left swivel type lamps 3R, 3L of the automobile and can communicate with the ECU 2 bidirectionally. The ECU 2 includes a main CPU 201 serving as a main control circuit. The main control circuit executes a predetermined algorithm based on a steering angle and a vehicle speed, detected, respectively, by the steering sensor 1A and the vehicle speed sensor 1B and which provides a predetermined control signal C0 as an output. The ECU 2 also includes an interface (I/F) circuit 202, which is provided between the main CPU 201 and the actuator 4 to input and output the control signal C0. In this example, the control signal C0 is a left and right deflection angle signal for controlling the optical axis deflection angle of the swivel type lamps 3R, 3L with respect to the actuator 4.

A sub-control circuit 43 in the actuator 4 provided in each of the left and right swivel type lamps 3R, 3L of the automobile includes a sub-CPU 431, an I/F circuit 432 for receiving a signal from and outputting a signal to the ECU 2, and a motor drive circuit 433 for rotating a brushless motor 42 that serves as a driving source housed within the case 41 of the actuator 4 as a rotation driving means and rotates the rotation output shaft 411. The sub-CPU 431 controls the motor drive circuit 433 to drive the motor 42 in accordance with the control signal C0 from the ECU 2 which is entered through the I/F circuit 432, whereby the deflection angle of the projector lamp 30 can be controlled.

According to the foregoing configuration, the ECU 2 receives the signal representing the rotation angle of the steering wheel (SW)—that is, the steering angle of an automobile detected by the steering sensor 1A in the automobile (CAR)—and the signal representing the vehicle speed of the automobile detected by the vehicle speed sensor. The ECU 2 performs the calculation at the main CPU 201 based on the detected signals to obtain the left and right deflection angle signals C0 of the projector lamps 30 at the swivel type lamps 3R, 3L and supplies the signals to the actuators 4 of the swivel type lamps 3R, 3L, respectively. In the actuator 4, the sub-CPU 431 performs the calculation based on the left and right deflection angle signal C0 to generate a signal corresponding to the left and right deflection angle signal C0 and supplies the signal to the motor drive circuit 433 to rotate the motor 42. The rotation driving speed of the motor 42 is decelerated and transmitted to the rotation output shaft 411 to rotate the projector lamp 30 coupled to the rotation output shaft 411 in the horizontal direction, whereby the irradiation direction (optical axis direction) of the swivel type lamp 3R or 3L is deflected to the left and right directions. The deflection angle of the projector lamp 30 is detected by a rotation angle sensor (not shown) and the detected deflection angle is fed back to the sub-CPU 431, whereby the projector lamp can be controlled to have a deflection angle corresponding to the left and right deflection angle signal C0.

Figure 5:
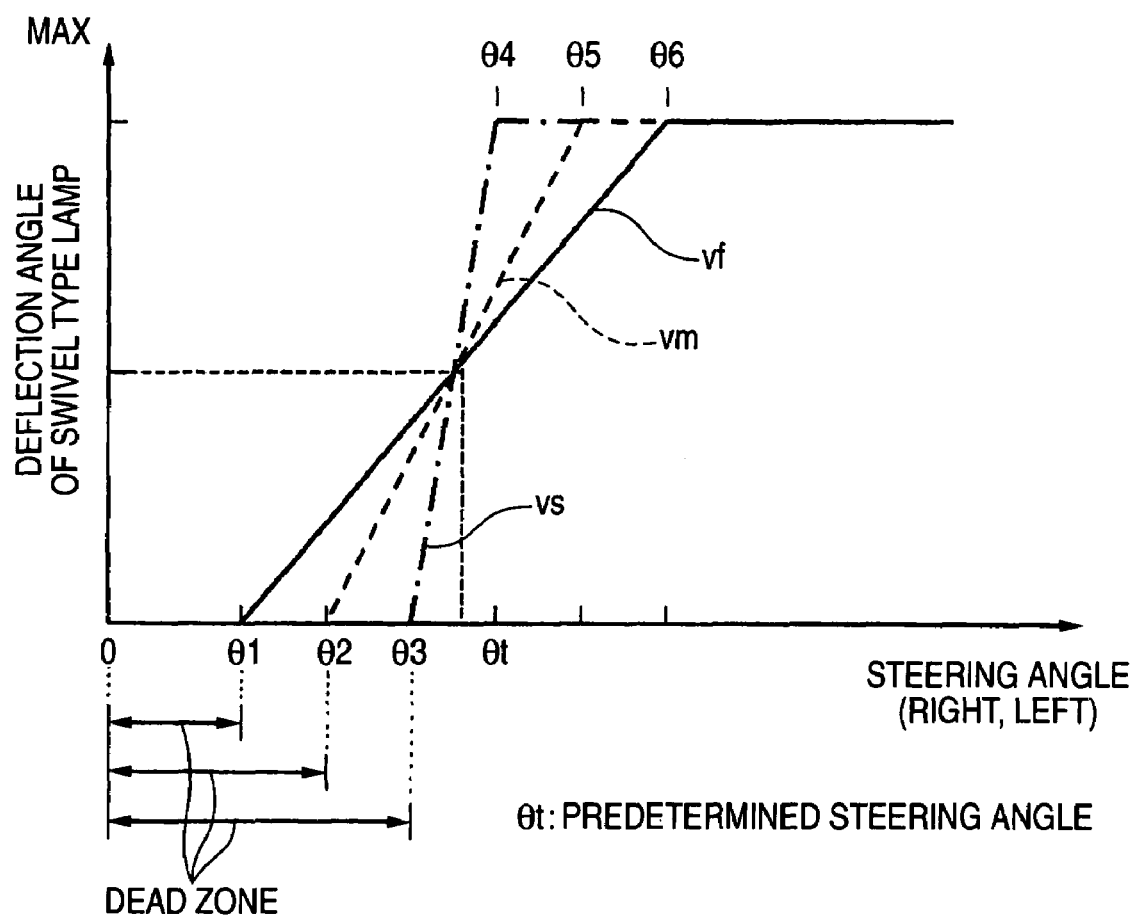
FIG. 5 is a characteristic diagram showing an example of the characteristics of the deflection angles with respect to steering angles.

FIG. 5 is a diagram showing the characteristics of the rate of change when the ECU performs the AFS control so as to change the deflection angle of the swivel type lamp in accordance with the vehicle speed. In the figure, the abscissa represents the steering angle and the ordinate represents the deflection angle of the swivel type lamps. According to this figure, assuming that the steering angle while traveling on a straight road is zero, the deflection angle of the swivel type lamps increases gradually as the steering angle increases. Furthermore, symbols vs, vm, vf in the figure represent the characteristics in a low speed range (30 Km/hour or less), the characteristics in a middle speed range (30 to 70 Km/hour) and the characteristics in a high speed range (70 Km/hour or more), respectively. The speed ranges in this case are merely an example. As to the characteristics (vs) at the low speed range, although the deflection angle is zero until the steering angle increases to $\theta 3$, the deflection angle increases at a relatively large rate (inclination) with a large and steep inclination when the steering angle exceeds the value $\theta 3$, and reaches a maximum deflection angle MAX when the steering angle reaches $\theta 4$. As to the characteristics (vm) at the middle speed range, although the deflection angle is zero until the steering angle increases to $\theta 2$, which is smaller than $\theta 3$, the deflection angle increases at an intermediate rate when the steering angle exceeds the value $\theta 2$, and reaches a maximum deflection angle MAX when the steering angle reaches $\theta 5$, which is larger than $\theta 4$. Furthermore, as to the characteristics (vf) at the high speed range, although the deflection angle is zero until the steering angle increases to $\theta 1$, which is smaller than $\theta 2$, the deflection angle increases at a small rate with a small and gentle inclination when the steering angle exceeds the value $\theta 1$, and reaches a maximum deflection angle MAX when the steering angle reaches $\theta 6$, which is larger than $\theta 5$. The characteristics vs, vm, vf cross at a predetermined steering angle $\theta t$, and the magnitudes of the deflection angles with respect to a steering angle among the respective characteristics are inverted between the steering angles smaller than predetermined steering angle $\theta t$ and the steering angles larger than the predetermined steering angle $\theta t$. The characteristics shown in this figure relate only to one of the steering operation for the right and left. The characteristics relating to the other steering operation may be similar. Each of the regions from the steering angle zero while traveling on a straight road to $\theta 1$, $\theta 2$, $\theta 3$ is a dead zone in which the swivel type lamp is not deflected even when the steering operation is performed.

Figure 6:
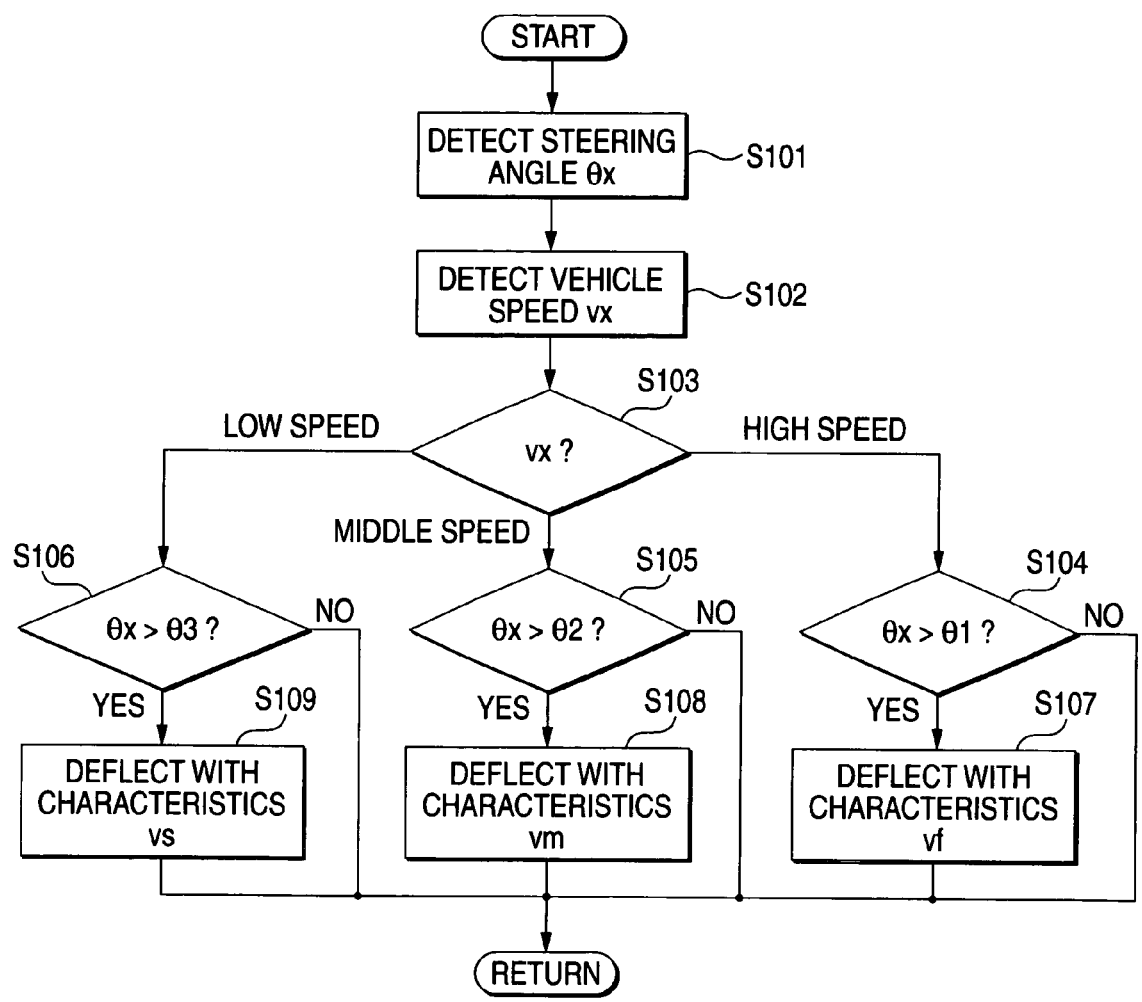
FIG. 6 is a flow chart for explaining the deflection operation.

FIG. 6 is a flowchart for explaining the deflection operation of the swivel type lamps. First, a steering angle ($\theta x$) is detected based on the output of the steering sensor 1A (S101). Then, a vehicle speed (vx) is detected based on the output of the vehicle speed sensor 1B (S102). Next, it is determined whether the detected vehicle speed (vx) belongs to the low, middle or high speed range (S103). Then, it is determined whether or not the detected steering angle ($\theta x$) is within one of the dead zones relating to $\theta 1$, $\theta 2$, $\theta 3$ corresponding to the determined speed range (S104, S105, S106). When the detected steering angle belongs to the dead zone, the deflection operation of the swivel lamps is not performed, and the process is repeated. In contrast, when the detected steering angle does not belong to the dead zone, the swivel lamps are deflected in accordance with the corresponding one of the characteristics Vf, vm, vs (S107, S108, S109).

Figure 7:
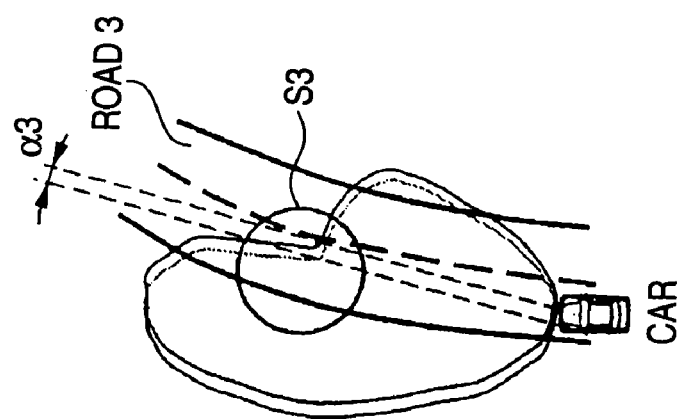
FIGS. 7(a), 7(b) and 7(c) are diagrams of light distribution patterns showing the deflection angles at low, middle and high speed ranges.
Figure 7:
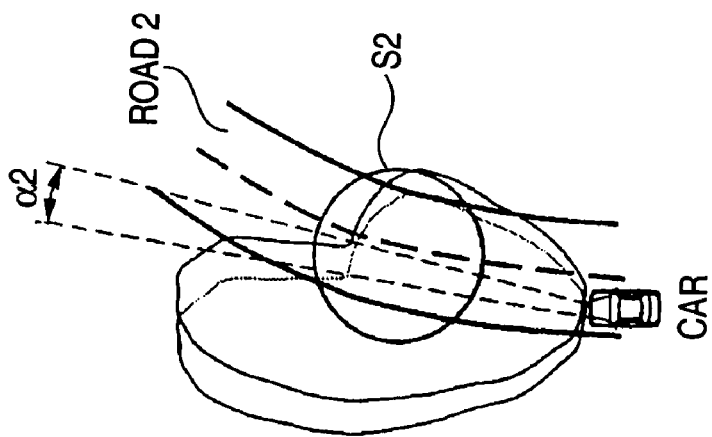
Figure 7:
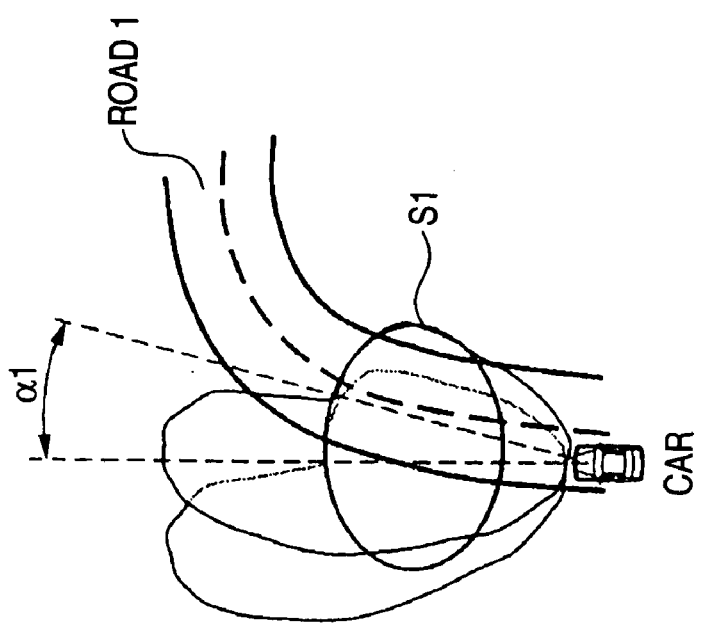

In this manner, when the rate of change of the deflection angle of the swivel lamps is controlled in accordance with the vehicle speed, particularly, in a manner that the rate of change of the deflection angle of the swivel lamps with respect to the steering angle is made smaller as the vehicle speed increases, the following control of the irradiation direction can be obtained. FIGS. 7(a), 7(b) and 7(c) are schematic plan views showing situations in which an automobile (CAR) travels on a curved road at a low speed, an intermediate speed and a high speed, respectively. When an automobile travels on a road (ROAD1) with a small radius of curvature as shown in FIG. 7(a), the automobile typically travels at a low speed. When traveling at such a low speed, since the rate of change of the deflection angle is large with respect to the steering angle, an angular change amount ($\alpha 1$) in the irradiation direction of the swivel lamps becomes large when the steering wheel is operated by a small amount (i.e., when the steering angle is steered slightly). Thus, a relatively wide area (S1) close to an area just ahead of the automobile in the direction of travel is irradiated corresponding to the radius of curvature of the curved road. Visibility of the area (S1) may be improved.

On the other hand, when the radius of curvature is large, such as for the road (ROAD2) in FIG. 7(b), the automobile tends to increase its speed and, thus, travels at the middle speed. In the case of traveling at the middle speed, the rate of change of the deflection angle becomes smaller with respect to the steering angle and, thus, an angular change amount ($\alpha 2$) in the irradiation direction of the swivel lamps becomes smaller when the steering wheel is operated by the same angle as in the previous case. An intermediate-size area (S2) away from the area just ahead of an automobile in the direction of travel is irradiated corresponding to the radius of curvature of the curved road. Again, the visibility of the area (S2) may be improved. When the radius of curvature is larger, such as for the road (ROAD3) as shown in FIG. 7(c), the automobile may further increase its speed and travel at the high speed. In the case of traveling at the high speed, the rate of change of the deflection angle becomes even smaller with respect to the steering angle, and so an angular change amount ($\alpha 3$) in the irradiation direction of the swivel lamps becomes even smaller. Thus, a relatively distant area (S3) in the direction of travel is concentrically irradiated corresponding to the large radius of curvature of the curved road. Visibility of the area (S3) may be improved.

As previously noted, the dead zone in the steering angles may occur when traveling at the respective speed ranges. Therefore, when traveling along a substantially straight road, the techniques can prevent the irradiation ranges of the swivel type lamps from frequently deflecting by a small amount, which may be bothersome to the driver. In particular, when traveling at a high speed, since the steering angle of the automobile is close to the straight traveling state, even when the width of the dead zone is small, the foregoing result may be attained. Further, when traveling on the foregoing curved road, if the steering wheel is steered by a small angle, the swivel type lamps are immediately deflected in accordance with the steering operation, whereby a high responsibility is obtained. In contrast, since the steering angle in the middle or low speed traveling state becomes larger than that in the high speed traveling state, the width of the dead zone in the middle or low speed traveling state is made larger than that of the high speed traveling state. Thus, the deflection operation of the swivel type lamps can be prevented when traveling substantially straight so as to avoid bothering the driver.

According to the characteristics as shown in FIG. 5, in the region (except for the dead zone) where the steering angle is smaller than the predetermined steering angle ($\theta$t), the deflection angle of the swivel lamps with respect to a given steering angle is set to be larger as the vehicle speed increases. This is because it is often important to irradiate an area just ahead of an automobile than a portion of the road ahead of the curve at the low speed when the steering angle is smaller than the predetermined steering angle $\theta$t. It also often is important to irradiate a portion of the road ahead of the curve with a higher priority at the high speed. As described above, when the steering angle exceeds the predetermined steering angle ($\theta$t), the deflection angle of the swivel lamps with respect to a given steering angle is set to be smaller as the vehicle speed increases, so that good irradiation can be obtained for a curved road with a large radius of curvature.

Figure 8:
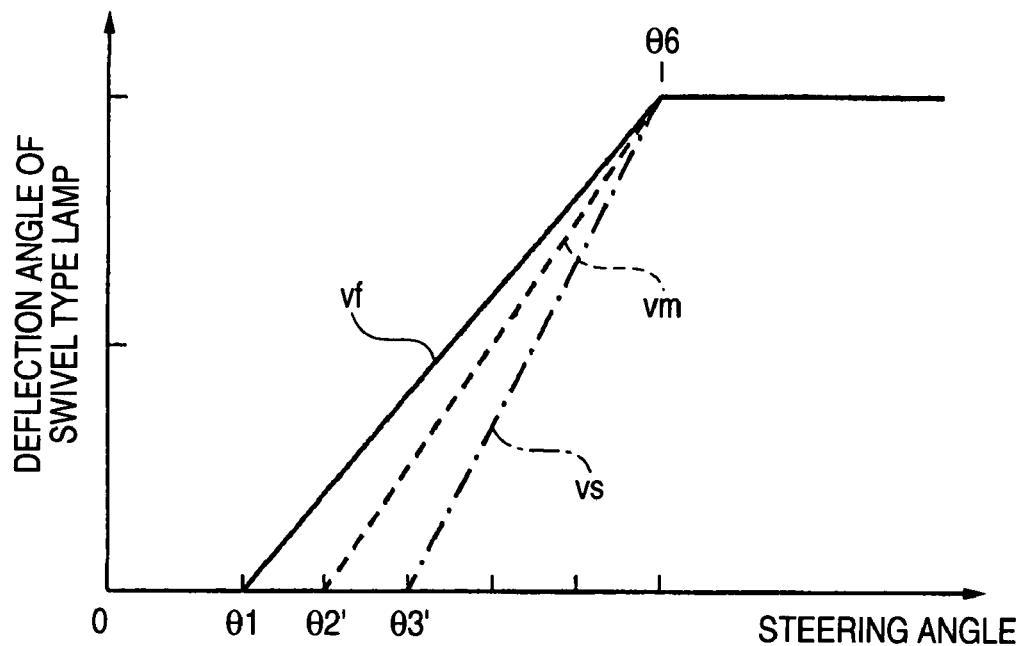
FIG. 8 is a characteristic diagram showing a modified example of the characteristics of the deflection angles with respect to steering angles.

Alternatively, the rate of change characteristics of the deflection angle may be set as shown in FIG. 8. In this figure, the symbols vs, vm, vf correspond to the similar symbols of FIG. 5. As in FIG. 5, the width of the dead zone is made smaller as represented by $\theta 1$, $\theta 2'$, $\theta 3'$ and the changing rate (inclination) of the deflection angle is made smaller as the vehicle speed increases. However, the steering angles at which the deflection angles reaches a maximum value (MAX) coincide with the steering angle $\theta 6$ with respect to the respective speed regions. According to these rate of change characteristics of the deflection angle, since the rate of change of the deflection angle with respect to the steering angle is made smaller as the vehicle speed increases, a portion of the curved road ahead of an automobile can be irradiated more suitably at the different vehicle speeds, like the characteristics of FIG. 5. Furthermore, since the width of the dead zone is made smaller as the vehicle speed increases, the deflection operation of the swivel lamps when traveling straight can be suppressed. Thus, the driver will not be bothered. Furthermore, according to this rate of change characteristics of the deflection angle, since the deflection angle with respect to a predetermined steering angle always becomes larger as the vehicle speed increases until the deflection angle reaches the maximum deflection angle (MAX), it is possible to irradiate a portion of the road ahead of the curve in the direction of travel in an earlier stage to enhance visibility.

Figure 9:
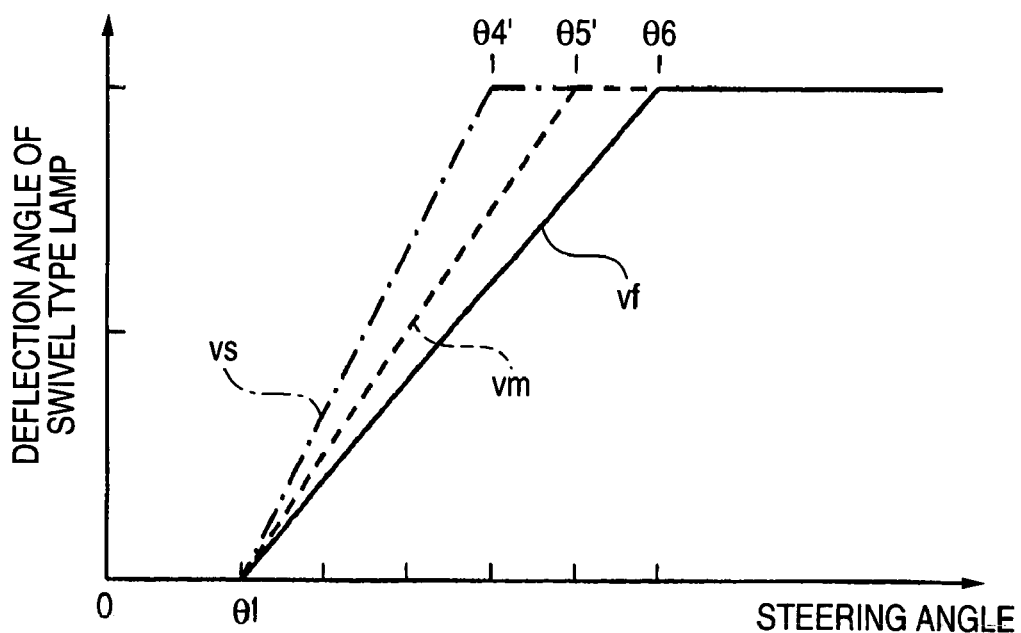
FIG. 9 is a characteristic diagram showing another modified example of the characteristics of the deflection angles with respect to steering angles.

Alternatively, as shown in FIG. 9, the width of the dead zone may be made to coincide with respect to all the respective speed regions such that the upper limit value of the steering angle defining the dead zone is $\theta 1$ with respect to all the respective speed regions. According to such characteristics, the changing rate (inclination) of the deflection angle is differentiated with respect to the respective speed regions from this steering angle $\theta 1$ so that the deflection angle reaches the maximum value (MAX) at the steering angle $\theta 4'$ for the low speed range, at the steering angle $\theta 5'$ for the middle speed range and at the steering angle $\theta 6'$ for the high speed range. According to such characteristics, since the rate of change of the deflection angle with respect to the steering angle becomes smaller as the vehicle speed increases, it is possible to improve the visibility at a portion of the road ahead of the curve like the characteristics of FIGS. 5 and 8. On the other hand, according to such characteristics, since the width of the dead zone is the same for the respective speed ranges, it is possible to stabilize the deflection operation within the constant steering angle range, regardless of the vehicle speed. Thus, it is possible to prevent a driver from being bothered regardless of the vehicle speed. To the contrary, according to such characteristics, the deflection angle with respect to the same steering angle becomes smaller as the vehicle speed increases. Thus, as compared to the characteristics of FIGS. 5 and 8, although the visibility at the distant area when entering into a curved road is slightly degraded, it is advantageous that the visibility at a portion just ahead of or near an automobile can be improved.

In the foregoing embodiment, it is assumed that the deflection angle of the swivel lamps changes linearly with respect to the steering angle. In other implementations, it is possible to set the characteristics to change in a non-linear manner. However, in such a situation, the rate of change of the deflection angle is made smaller as the vehicle speed increases like the previous embodiment.

In the foregoing description, the techniques are applied to a headlight in which the projector lamp constituting the swivel type lamp is deflected to the left and right directions to change the optical axis of irradiation. The techniques also may be applied to a headlight in which only a reflector is deflected or in which an auxiliary reflector provided independently from a main reflector is deflected to change the irradiation area substantially.

Other implementations are within the scope of the claims.

What is claimed is:

1. A vehicle lighting apparatus comprising lamps for installation at front portions of an automobile, wherein an irradiation direction of the lamps can be deflected in left and right directions based on a steering operation of a steering apparatus, and a rate of change of a deflection angle of the lamps with respect to a steering angle is made smaller as a vehicle speed increases to a high speed, and further wherein a dead zone of the steering angle is provided in which the deflection operation of the lamps is not performed for a predetermined range of the steering angle, including a steering angle when the vehicle is traveling in a straight direction.

2. A vehicle lighting apparatus according to claim 1, wherein a width of the dead zone is made smaller as the vehicle speed increases.

3. A vehicle lighting apparatus according to claim 2, wherein in a range of the steering angle which is smaller than a predetermined steering angle and except for the dead zone, the deflection angle with respect to the steering angle becomes larger as the vehicle speed increases.

4. A vehicle lighting apparatus according to claim 1, wherein in a range of the steering angle which is smaller than a predetermined steering angle and except for the dead zone, the deflection angle with respect to the steering angle becomes larger as the vehicle speed increases.

* * * * *